Jan. 23, 1934.  A. URFER  1,944,619
AIRCRAFT INDICATOR
Filed April 16, 1931  2 Sheets-Sheet 1

INVENTOR
Adolf Urfer
BY
F. B. Smith
ATTORNEY

Jan. 23, 1934.     A. URFER     1,944,619
AIRCRAFT INDICATOR
Filed April 16, 1931    2 Sheets-Sheet 2

INVENTOR
Adolf Urfer
BY
ATTORNEY

Patented Jan. 23, 1934

1,944,619

UNITED STATES PATENT OFFICE 1,944,619

AIRCRAFT INDICATOR

Adolf Urfer, Richmond Hill, N. Y., assignor to Pioneer Instrument Company, Incorporated, Brooklyn, N. Y., a corporation of New York Application April 16, 1931. Serial No. 530,713

1 Claim. (Cl. 33—204)

The present invention relates to indicating devices and more particularly to an instrument for indicating the relative position and motion of an aircraft in flight with respect to the surface of the earth.

Heretofore, it has been the practice in providing means for indicating the position and motion of an aircraft in flight to employ separate indicators each responsive to the motion of the craft about one of its axes. This necessitated the pilot's observing three separate instruments, located independently of each other upon an instrument panel, which made it difficult for the pilot to view all three instruments at one time to properly coordinate his controls for maintaining a desired condition of the craft for safe flying. It therefore made it difficult for the pilot to accurately obtain simultaneous readings on all three instruments, due to the different locations of the latter on the instrument board. Accordingly, one of the objects of the present invention is to provide a novel indicating instrument whereby the foregoing difficulties are eliminated.

Another object is to provide in an instrument of the above type, the combination of means responsive to the motion of an aircraft about its three axes, and a novel unitary indicator responsive to said means, whereby it is necessary to observe only a single pointer or indicator.

Another object is to provide a novel instrument for indicating the position and motion of an aircraft and embodying means responsive to the rolling and pitching of the craft, means responsive to the turning of the craft about a vertical axis, and single means responsive to both the first and second mentioned means, whereby observation of the condition of the craft is simplified.

A further object is to provide a novel unitary indicator of the above character embodying means associated with a pointer for indicating the relative position of said pointer, whereby the condition of the aircraft is readily determined.

A still further object is to provide an instrument of the class described, embodying a single pointer adapted to be actuated in response to the motion of an aircraft about its three axes, and a novel cover glass for the instrument which also serves as a dial in cooperation with the pointer, whereby the condition of the aircraft may be determined by observing the position of the pointer relative to the cover glass.

The above and other objects and advantages of the invention will appear more fully hereinafter from a consideration of the detailed description which follows, together with the accompanying drawings wherein is illustrated one embodiment of the invention. It is to be expressly understood, however, that the drawings are for the purpose of illustration and description only and are not designed as a definition of the limits of the invention, reference being had for this purpose to the appended claim.

In the drawings, wherein like reference characters refer to like parts throughout the several views, Fig. 1 is an axial section of one form of instrument embodying the present invention;

Figure 1:
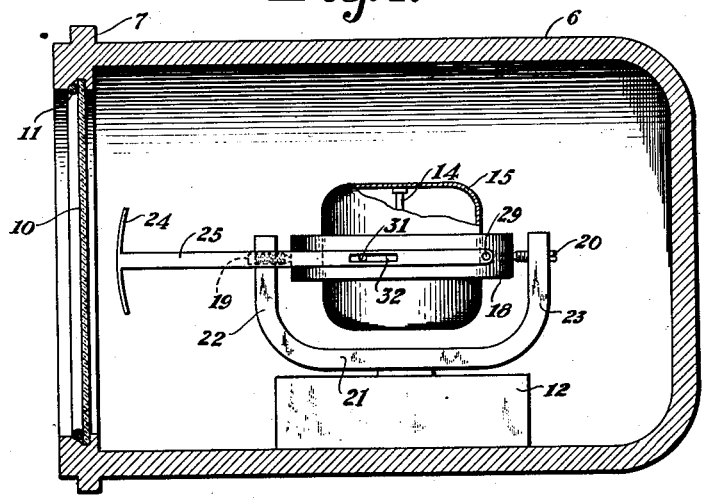
Figure 2:
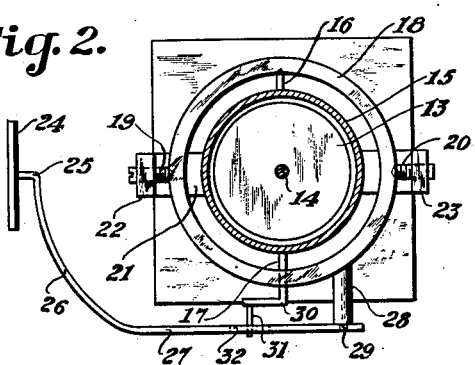
Fig. 2 is a plan view partially in section, looking down on the operating mechanism as indicated by the line 2—2 in Fig. 1.

As shown in Figs. 1 and 2, the instrument embodying the invention comprises a usual instrument casing within which is mounted the mechanism responsive to the motion of the aircraft about its three axes and to which is operatively connected a single pointer, visible through a cover glass mounted in the casing, said indicator being actuated by the mechanism, and its position relative to a suitable index provided on the cover glass being an indication of the attitude of the aircraft.

In the form shown, the instrument casing is indicated at 6 and may be of any suitable material, as for example cast aluminum in order to reduce the weight thereof, although it may be made of other suitable materials such as hard rubber or a phenolic condensation product. The casing is provided at its forward end with a peripheral flange 7 having projecting lugs or ears 8 spaced circumferentially thereabout, provided with apertures 9 for receiving suitable fastening elements whereby the instrument may be mounted on the dash or instrument panel of an aircraft. The novel cover glass 10, which will be described more fully hereinafter, is mounted in the forward end of the casing in any suitable manner, as by means of a retaining ring 11.

Means responsive to the turning of the aircraft about a vertical axis, as shown diagrammatically at 12, are suitably mounted and secured to the casing 6. Said means may be a magnetic compass or a directional gyroscope, the rotor of which has three degrees of freedom, and operating in accordance with the principle of the Sperry gyrocompass, or it may be a conventional gyroscopic turn indicator in which the rotor has only two degrees of freedom and is responsive to the rate of turn of the craft.

Means are also provided which are responsive to the inclination of the aircraft about its longitudinal and transverse axes and, in the embodiment illustrated, comprise what is known as an "artificial horizon" of the type shown and described in the Patent No. 1,324,128 issued to Elemer Meitner December 9, 1919. The "artificial horizon" is constituted by a gyro-rotor 13 having a shaft 14 journaled in a suitable casing 15. The rotor 13 is arranged to always rotate about a vertical axis and for this purpose the casing 15 is universally mounted in the usual manner, as by means of pivots 16 and 17 and a gimbal ring 18, the latter in turn being mounted in pivots 19 and 20 which are at right angles to the pivots 16 and 17. The pivots 19 and 20 are carried by a yoke member 21 having upwardly extending arms 22 and 23. Yoke 21 is operatively connected to and rotatable with the precessional frame (not shown) of the turn indicator 12 so that when the said frame precesses upon turning of the aircraft about a vertical axis, the yoke 21 will accordingly rotate to the left or right, thereby moving the artificial horizon therewith. Due to the universal mounting of the rotor 13 and its casing 15, the latter will always maintain a vertical position irrespective of the inclination of the aircraft about its longitudinal or its transverse axis.

Novel means are now provided for indicating the condition of the aircraft relative to all three of its axes in response to the actuation of the artificial horizon and the turn indicator upon which the former is mounted, and in the form shown comprise a member 24 in the form of a cross carried by an arm 25 having a curved portion 26 and a straight portion 27 and pivotally secured to the gimbal ring 18 as by means of an arm 28 secured to or formed integral with the gimbal ring. The purpose of the curved portion 26 of the arm 25 is to bring the cross member 24 in the center of the instrument and in alignment with the longitudinal axis thereof as represented by the pivots 19 and 20. It will be apparent that if the aircraft inclines to the left or to the right about its longitudinal axis, the yoke member 21 will incline therewith, while the gimbal ring 18 will remain in a normally horizontal position, due to its being pivotally supported about said axis, thereby producing relative motion between the arm 25 and the casing.

The arm 25 is also arranged to move about pivot 29 relative to the gimbal ring 18 when the aircraft inclines about its transverse axis as represented by the pivots 16 and 17, and the angular distance of travel of the arm reduced so that it will not strike the sides of the casing, thereby preventing distortion or possible breaking of the arm. For this purpose a lever arm 30 is secured to or formed integral with the pivot 17 which is affixed to the rotor casing 15. A pin 31 extending from the lever arm 30 is arranged to engage the straight portion 27 of the arm 25 in a slot 32. It will be apparent from this inter-linkage connection between the rotor casing 15 and the arm 25, that the latter will be moved angularly up or down on its pivot 29 when the aircraft is ascending or descending, due to the relative motion between the rotor casing 15 and the gimbal ring 18 about the pivots 16 and 17, and the angular distance of travel of the arm will be reduced about 2 to 1 so that when the casing 15 is inclined 90 degrees relative to the gimbal ring 18, the arm is made to incline only about 45 degrees or less, depending on the amount of space in the casing. It will also be apparent that upon the turning of the aircraft about the vertical axis, the yoke 21 will be actuated to the left or to the right in accordance with the turn, thereby carrying with it the arm 25. It will thus be seen that the cross member 24 is arranged to be actuated in three directions in response to the motion of the craft about its three axes, viz., banking, turning and climbing or descending.

Figure 3:
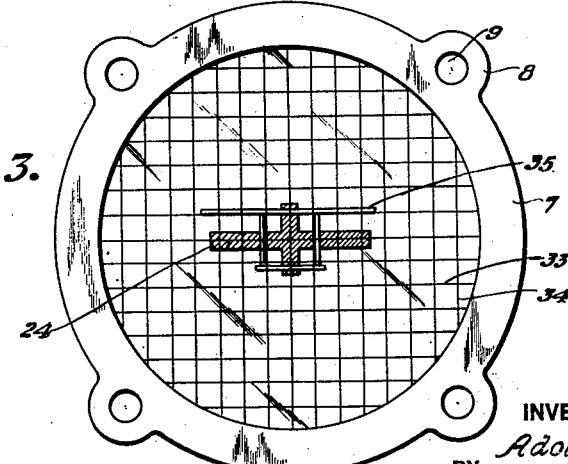
Fig. 3 is a front elevation of the instrument showing the position of the pointer relative to the novel cover glass when the aircraft is in level flight.
Figure 4:
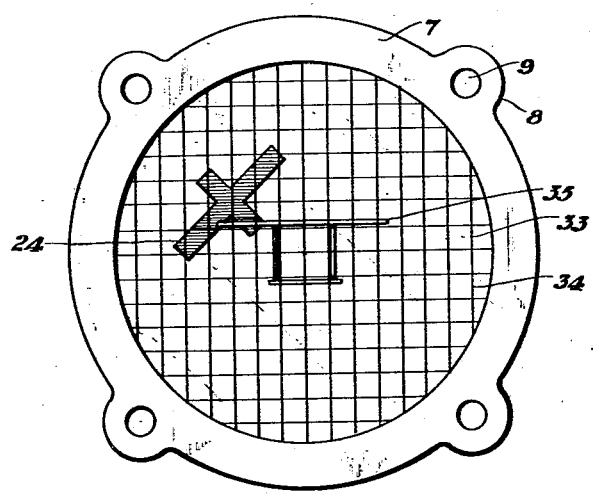
Figs. 4 and 5 are views similar to Fig. 3 showing the position of the pointer when the aircraft is turning, banking, and climbing, and turning, banking and descending, respectively.
Figure 5:
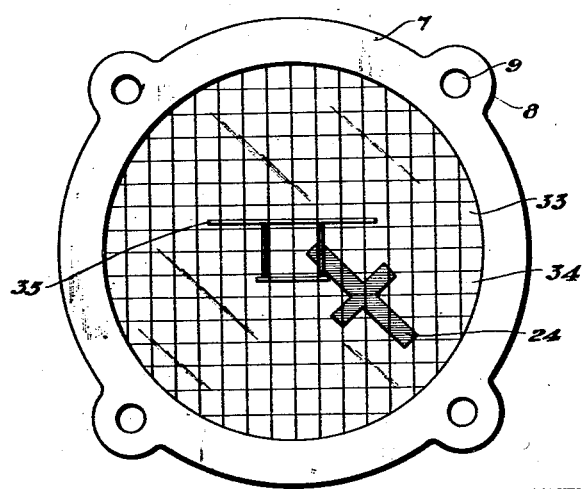

Means are now provided for co-relating the position of the cross member 24 with respect to the position and motion of the aircraft in flight, and to this end the novel cover glass 10, hereinbefore mentioned, is employed. A series of horizontal and vertical intersecting cross-lines 33 and 34 respectively are suitably marked on the glass, as for example by etching. A suitable image 35 in the form of a monoplane, for example, is also provided on the cover glass and located centrally thereof. The cross-lines 33 and 34 and the image 35 serve as an index with which the cross member 24 cooperates to indicate the attitude or condition of the craft. For example, in Fig. 3 the cross member 24 is shown coinciding with the image, indicating that the aircraft is in level flight. In Fig. 4 cross member 24 is shown slightly above and to the left of the image, and also inclined to the left at an angle in respect to the cross-lines thereby indicating that the aircraft is ascending and making a left turn at a left bank, while in Fig. 5 the cross-member is shown slightly below and to the right of the image and also inclined to the right at an angle in respect to the cross lines, thereby indicating that the aircraft is descending and making a right turn at a right bank.

There is thus provided a novel instrument for indicating the relative position and motion of an aircraft which embodies a single indicator or pointer for producing such indications, thus eliminating the difficulty of the pilot of the aircraft having to view several instruments in order to properly coordinate his controls for maintaining the desired attitude of the craft for safe flying.

While only one embodiment of the invention has been illustrated and described, other changes and modifications which will now appear to those skilled in the art, may be made without departing from the scope of the invention, and reference is therefore to be had to the appended claim for a definition of the limits of said invention.

What is claimed is:

An aircraft indicator comprising a casing, a transparent cover glass for said casing and having a plurality of horizontal and vertical intersecting lines thereon, an image in the center of said cover glass simulating a fore and aft elevation of an aircraft in level flight, the vertical and transverse axes of said image being parallel to the vertical and horizontal intersecting lines respectively, and the longitudinal axis of said image being parallel to or coincident with the longitudinal axis of an aircraft when the instrument is carried thereby, means in said casing responsive to the bank and pitch of an aircraft, means responsive to the turning of said craft and controlling said bank and pitch responsive means in accordance with a turn of the craft, and an indicating member simulating the wings of an aircraft and carried by said first-named means and controlled thereby so as to move vertically and horizontally parallel to the respective intersecting lines on the cover glass and also to move angularly about an axis parallel to the longitudinal axis of the craft, the image and indicating member being in register with each other when the aircraft is in level flight, and when not in register the attitude of said member with respect to said intersecting lines represents the actual attitude of the aircraft in space.

ADOLF URFER.